United States Patent
Lee et al.

(10) Patent No.: US 7,106,406 B2
(45) Date of Patent: Sep. 12, 2006

(54) LIQUID CRYSTAL DISPLAYS WITH MULTI-DOMAIN EFFECT FORMED BY SURFACE UNDULATIONS

(75) Inventors: Sin-Doo Lee, Seoul (KR); Jae Hong Park, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/820,294

(22) Filed: Apr. 8, 2004

(65) Prior Publication Data

US 2004/0218137 A1 Nov. 4, 2004

Related U.S. Application Data

(63) Continuation of application No. PCT/KR02/01876, filed on Oct. 8, 2002.

(30) Foreign Application Priority Data

Oct. 8, 2001 (KR) ...................... 10-2001-0061915

(51) Int. Cl.
*G02F 1/1337* (2006.01)
(52) U.S. Cl. ...................... 349/129; 349/128; 349/130; 349/160; 349/191
(58) Field of Classification Search ........ 349/128–130, 349/191, 125, 160
See application file for complete search history.

(56) References Cited

U.S. PATENT DOCUMENTS

| | | | | |
|---|---|---|---|---|
| 4,693,557 A | * | 9/1987 | Fergason | ........................ 349/7 |
| 5,677,744 A | * | 10/1997 | Yoneda et al. | ................. 349/12 |
| 5,725,915 A | * | 3/1998 | Ishitaka et al. | ............. 428/1.31 |
| 6,335,775 B1 | * | 1/2002 | Iwamura et al. | ............. 349/125 |
| 6,362,863 B1 | * | 3/2002 | Kataoka et al. | ............. 349/123 |
| 6,476,894 B1 | * | 11/2002 | Kikkawa | ..................... 349/123 |
| 6,535,257 B1 | * | 3/2003 | Miller | ......................... 349/113 |
| 6,549,256 B1 | * | 4/2003 | Bryan-Brown et al. | ..... 349/128 |
| 6,549,257 B1 | * | 4/2003 | Liu | ............................. 349/129 |
| 6,567,144 B1 | * | 5/2003 | Kim et al. | ................... 349/128 |
| 6,753,551 B1 | * | 6/2004 | Cheng | ......................... 257/79 |

FOREIGN PATENT DOCUMENTS

| | | |
|---|---|---|
| EP | 1 223 604 A1 | 7/2002 |
| JP | 01270024 A * | 10/1989 |
| KR | 1999-57123 A | 7/1999 |
| KR | 2000-0020198 A | 4/2000 |
| KR | 2000-65706 A | 11/2000 |

* cited by examiner

*Primary Examiner*—Andrew Schechter
(74) *Attorney, Agent, or Firm*—Cantor Colburn LLP

(57) ABSTRACT

A liquid crystal display comprising an upper substrate having the inner surface on which an upper electrode and an upper grating film having surface undulation are laminated; a lower substrate having the inner surface on which a lower electrode and a lower grating film having surface undulation are laminated, the said inner surface of the lower substrate being located facing the inner surface of the upper substrate; and the liquid crystal having dielectric anisotropy which is sealed in the space between the upper substrate and the lower substrate is presented. The liquid crystal display may accomplish wide viewing angles and high contrast ratio.

29 Claims, 12 Drawing Sheets

LIQUID CRYSTAL DISPLAYS WITH MULTI-DOMAIN EFFECT FORMED BY SURFACE UNDULATIONS

The present application is a continuation of PCT/KRO2/01876 filed 8 Oct. 2002.

TECHNICAL FIELD

The present invention relates to a liquid crystal display. More particularly, the present invention relates to a liquid crystal display which has wide and symmetric viewing angles and high contrast ratio and for which the manufacturing process is simple.

BACKGROUND ART

The liquid crystal display ("LCD") has already been a leader of information display devices and its market occupation ratio is very high. It has advantages of low power consumption and light weight. But it has drawbacks of narrow viewing angles and low speed response in comparison with the cathode ray tube ("CRT"). These drawbacks have not yet been resolved. Among these drawbacks of the LCD, the issue of narrow viewing angles is a particularly fatal problem as the size of the display panel is becoming larger and larger. To solve this problem of narrow viewing angles, the following methods have been introduced.

First, there is the in-plane switching ("IPS") method for driving the liquid crystal by forming electrodes on only one side of the liquid crystal substrate to improve the characteristics of the viewing angles. This method is the one utilizing the configuration of the electrodes. According to this method, the dark state is obtained if no electric field is applied under the condition that the liquid crystal is aligned in parallel to the substrate and the optic axis of the liquid crystal is coincident with one of the polarizers (one of which is perpendicular to the other). The bright state is obtained when the electric field is applied. According to this method, wide viewing angles may be obtained because the change in the average optic axis occurs on a plane that is parallel to the surface of substrate. However, the response time becomes longer than the response time of the LCD in twisted nematic (TN) mode because twisted distortions occurs mostly. Furthermore, the aperture ratio is low in this method because the electrodes are formed on only one side of the substrate. In addition, the production yield is also low because the default in relation to the alignment occurs frequently.

Second, there is a method to obtain wide viewing angles utilizing an alignment structure of the liquid crystal. For example, the structure of an optically self-compensating Pi (π) cell has been introduced. In this structure, the thickness of a liquid crystal cell is determined so that there would be a phase lag of a half wavelength from the light projected vertically to the substrate when the initial director of the liquid crystal is maintained. The liquid crystal is aligned to form an angle of 45° between the direction of liquid crystal molecules projected on the substrate and the optic axis of the polarizer. In this way, the double refraction of the tilted incident light becomes less than that of the vertically incident light. Therefore, the viewing angles are made relatively wider in the off state. However, this method has the difficulty of controlling the alignment properties precisely.

Another example is a method utilizing the reverse TN effect, i.e., the homeotropic to twisted-planar (HTP) transition effect, by applying voltage in an initial state of the vertical alignment. In this method, a chiral dopant and a nematic liquid crystal which has negative dielectric anisotropy are used. According to this method, a high transmissivity is obtained because of the driving mechanism which is reciprocal to that for the general TN. A perfect dark state can be obtained between the two perpendicular polarizers at the off state. Thus, high contrast ratio and superior viewing angles may be obtained in comparison to the general TN. However, symmetric viewing angles still cannot be obtained in the on state.

Third, there is a commonly used method of utilizing an optical compensation film. In this method, the change in double refraction dependent upon the azimuthal angle is compensated by an uniaxial optical compensation film because the TN-LCD has a structurally asymmetric property at the time of driving. However, this method has problems because color dispersion is caused by the wavelength-dependent refraction dispersion of the liquid crystal and because the manufacturing process is complex and the production cost is high.

In addition to the above-mentioned methods, several methods which improve the viewing angle characteristics by inducing the change of the optic axis in different domains of a unit pixel using the multi-domain (MD) alignment are known. For example, the MD-TN (Multi-Domain twisted nematic) method obtains the symmetrical viewing angle dependent upon the azimuthal angle by dividing each pixel into four multi-domains and by causing the direction of the distortion of the nematic liquid crystal to be different in each domain. However, this method also has a shortcoming because the manufacturing process is complex since different rubbing processes of different directions are required for multi-domains and, thus, the production yield is low and the production cost is high. Furthermore, the reproducibility is low because of the defects that arise on a boundary of each domain during the driving.

As a similar method to the MD-TN, the MD-VA (multi-domain vertical alignment) method is known. In this method, the initial aligning direction is maintained to be vertical in each domain of a unit pixel. Thus, the light leakage is very low in the off state and the contrast ratio is high. However, this method has also problems, as with the MD-TN method, because each domain must go through the rubbing process of a different direction for each of the domains. The manufacturing process is complex because several alignment processes should be applied. Furthermore, defects may occur on a boundary of each domain during the driving.

Another method, the a-TN (amorphous twisted-nematic) method, is also known. It is a technique for improving the viewing angles by forming very small domains of arbitrary aligning directions in a unit pixel without rubbing processes. This method has an advantage in that the manufacturing process is very simple. However, it is practically impossible to control sizes of the small domains because the small domains are formed in arbitrary sizes. Further, the reproducibility is low.

The recently proposed ASM (axially symmetric aligned microcell) method obtains the circularly symmetric viewing angles by mixing the liquid crystal with polymer and using the phase separation in each pixel. In this method, it is possible to obtain uniform alignment of the liquid crystal on a large area without rubbing processes. However, there is a problem regarding the reliability of polymer. Furthermore, the precise control of the phase separation is difficult and the manufacturing process is complex. Thus, this method cannot be applied to mass production of LCDs.

DISCLOSURE OF INVENTION

The present invention is to resolve the problems of the prior art. The object of the present invention is to provide a liquid crystal display wherein the multi-domains are formed in liquid crystals using surface undulation. By the multi-domains, the sub-pixels with different alignments are formed in a unit pixel, and the viewing angles of these sub-pixels are compensated. Therefore, the liquid crystal display according to the present invention may have a high contrast ratio and wide viewing angles.

In order to achieve the above objects, the liquid crystal display according to the present invention comprises:

an upper substrate having the inner surface on which an upper electrode and an upper grating film having surface undulation are laminated;

a lower substrate having the inner surface on which a lower electrode and a lower grating film having surface undulation are laminated, the said inner surface of the lower substrate being located facing the inner surface of the upper substrate; and the liquid crystal having dielectric anisotropy which is sealed in the space between the upper substrate and the lower substrate.

That is, in the present invention, multi-domains are formed by surface undulation, and the sub-pixels having different alignment to one another are formed in a unit pixel because of the multi-domains. Thus, the viewing angles of these sub-pixels are compensated for one another, and the liquid crystal display according to the present inventions may have a high contrast ratio and wide viewing angles.

Figure 1A:
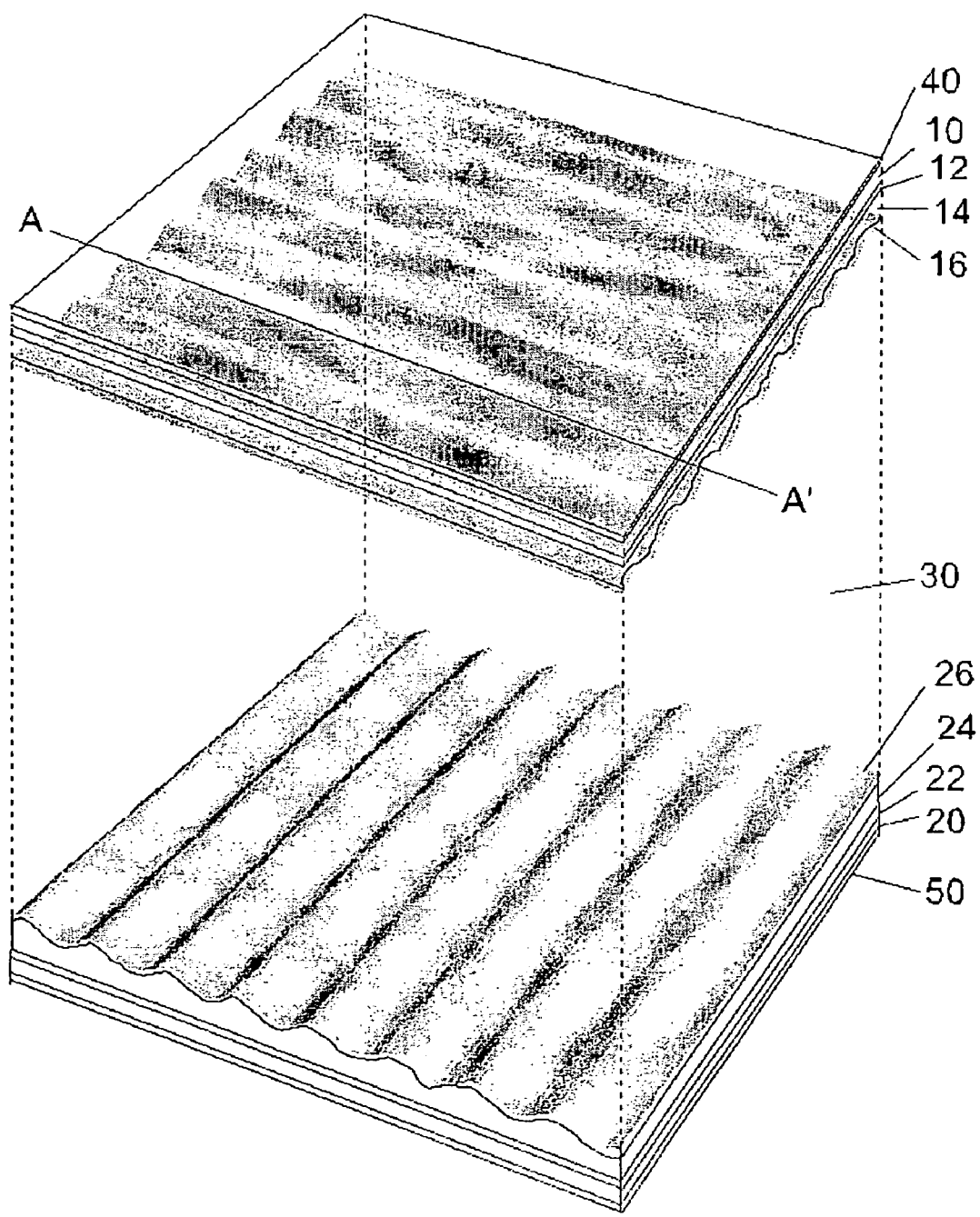
FIGS. 1a and 1b illustrate liquid crystal displays according to the present invention wherein the two one-dimensional surface undulations are perpendicular to each other.

<Description of reference numerals for important parts of the drawings>

| 10: | upper substrate | 20: | lower substrate |
|---|---|---|---|
| 30: | liquid crystal | 12: | upper electrode |
| 22, 60: | lower electrode | 14: | first grating film |
| 24: | second grating film | 16: | first vertical alignment film |

-continued

<Description of reference numerals for important parts of the drawings>

| 26: | second vertical alignment film | 40, 50: | polarizer |
|---|---|---|---|
| 70: | optical compensation film | 80: | diffusion sheet |

BEST MODE FOR CARRYING OUT THE INVENTION

Reference will now be made in detail to the present invention as illustrated in the accompanying drawings.

Figure 1B:
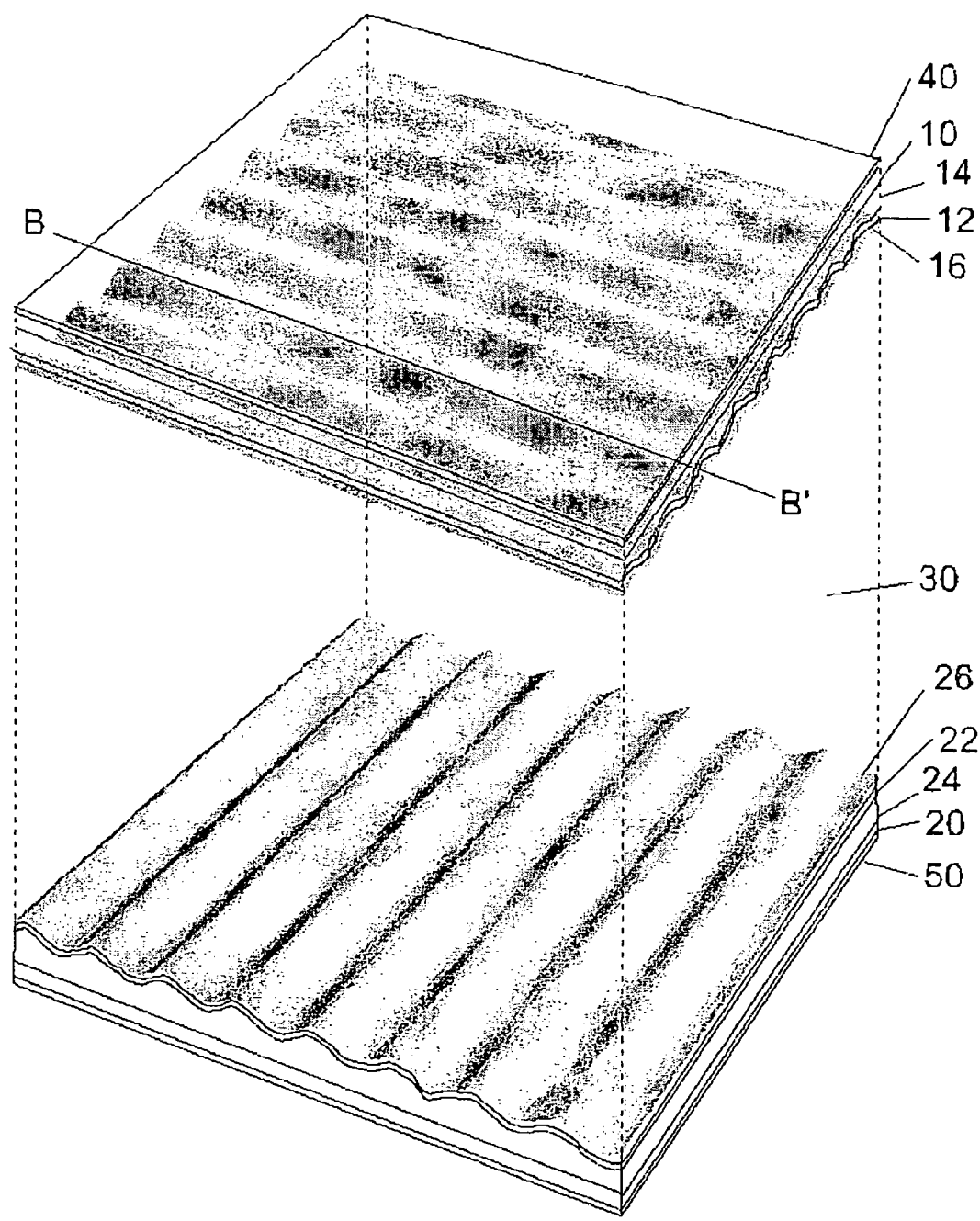
Figure 2A:
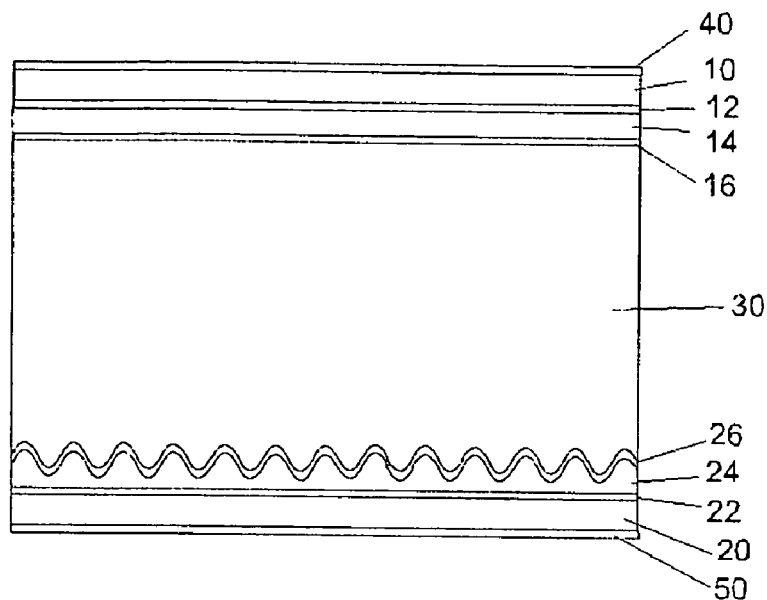
FIGS. 2a and 2b illustrate vertical cross-sectional views of the liquid crystal display illustrated in FIG. 1.
Figure 2B:
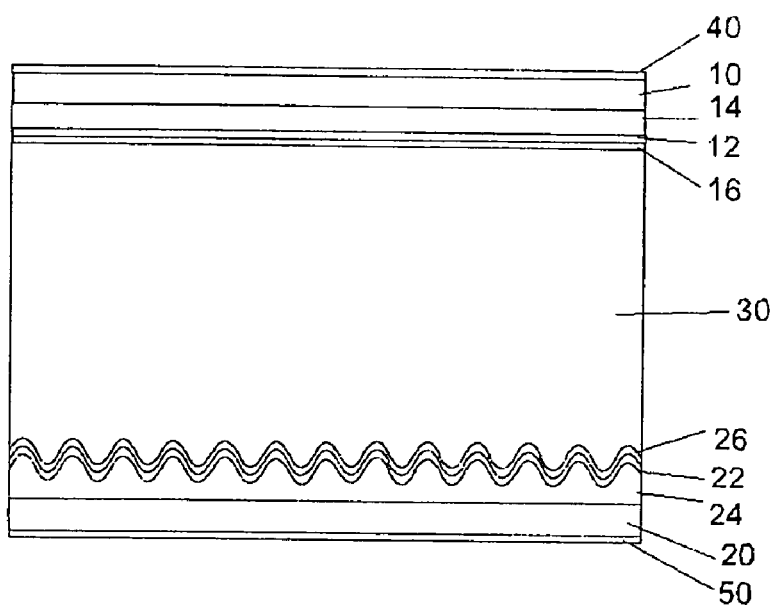

FIGS. 1a and 1b illustrate liquid crystal displays according to the present invention wherein the two one-dimensional surface undulations are perpendicular to each other. FIG. 1a illustrates a liquid crystal display wherein electrodes 12, 22 are formed first and, then, the grating films 14, 24 having surface undulation are formed. FIG. 1b illustrates a liquid crystal display wherein the grating films 14, 24 having surface undulation are formed first and, then, the electrodes 12, 22 are formed. FIGS. 2a and 2b illustrate vertical cross-sectional views of the liquid crystal displays illustrated in FIGS. 1a and 1b. FIG. 2a illustrates the vertical cross-sectional view along the line A–A' in FIG. 1a. FIG. 2b illustrates the vertical cross-sectional view along the line B–B' in FIG. 1b.

The liquid crystal display illustrated in FIG. 1a or 2a comprises an upper substrate 10, a lower substrate 20, and the liquid crystal 30. An upper electrode 12 which is transparent is formed on one side of the upper substrate 10, and the first grating film 14 having one-dimensional surface undulation is laminated on the electrode 12. The first vertical alignment film 16 is formed on the first grating film 14. Similarly, a lower electrode 22 which is transparent is formed on one side of the lower substrate 20, and the second grating film 24 having one-dimensional surface undulation is laminated on the lower electrode 22. The second vertical alignment film 26 is formed on the second grating film 24.

The liquid crystal displays illustrated in FIGS. 1b and 2b are the same as those illustrated in FIGS. 1a and 2a except that the first grating film 14 or the second grating film 24 having one-dimensional surface undulation is formed first and, then, the upper electrode 12 or the lower electrode 22 which is transparent is formed.

FIGS. 1a, 1b, 2a and 2b illustrate liquid crystal displays wherein the sequential order of the lamination of the lower electrode 22 and the second grating film 24 on the inner surface of the lower substrate 20 is the same as that of the lamination of the upper electrode 12 and the first grating film 14 on the inner surface of the upper substrate 10. However, it is possible to implement a liquid crystal display wherein the sequential order of the lamination of the lower electrode 22 and the second grating film 24 on the inner surface of the lower substrate 20 is different from that of the lamination of the upper electrode 12 and the first grating film 14 on the inner surface of the upper substrate 10.

Generally, the upper first grating film 14 and the lower second grating film 24, which have the one-dimensional surface undulation respectively, may be configured to form any magnitude of angle to each other. FIGS. 1a, 1b, 2a and 2b illustrate liquid crystal display wherein the angle formed between the first grating film 14 and the second grating film 24 is 90°. In these examples, the nematic liquid crystal 30 sealed between the substrates has negative dielectric anisotropy because the vertical alignment films 16, 26 are used. In FIGS. 1a, 1b, 2a and 2b, the polarizers 40, 50 are attached so that their optic axes are perpendicular to each other.

In the liquid crystal display according to the present invention, a vertical alignment film or a horizontal alignment film may be formed on at least one of the upper substrate and the lower substrate. In this case, preferably, the pretilt angle of the liquid crystal from the direction normal to the upper substrate or the lower substrate is between 0° and 9°.

Figure 3A:
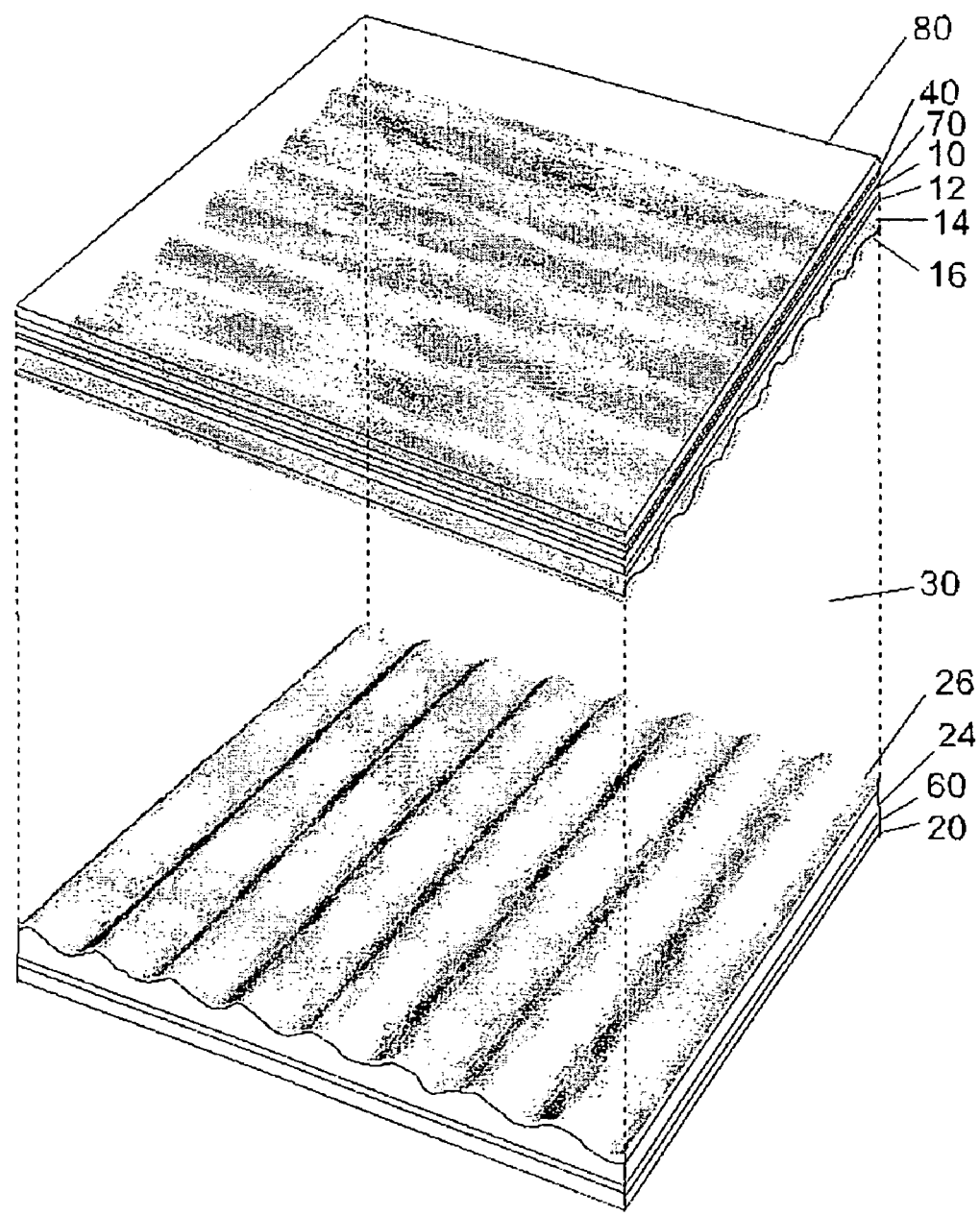
FIGS. 3a and 3b illustrate liquid crystal displays of the reflection type according to the present invention.
Figure 3B:
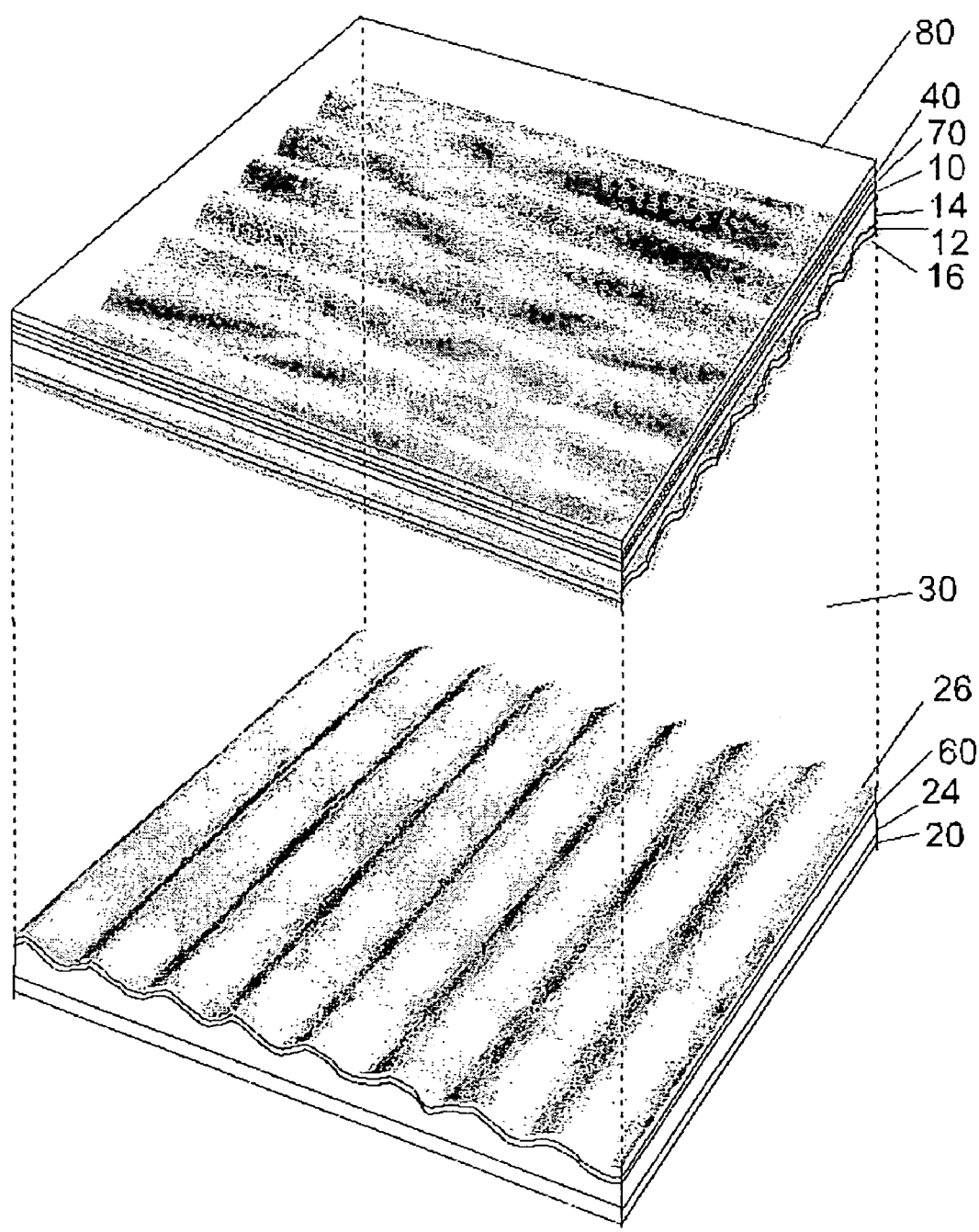

FIGS. 3a and 3b illustrate liquid crystal displays of a reflection mode implemented according to the present invention. As with the liquid crystal displays illustrated in the FIGS. 1a and 1b, two polarizers 40, 50, i.e., the upper polarizer and the lower polarizer may be used. However, in FIGS. 3a and 3b, only one polarizer 40 is used.

In FIGS. 3a and 3b, a diffusion sheet 80 is attached on the polarizer 40 of the upper substrate. The lower electrode 60 serves as a reflection plate at the same time by using aluminum having high reflectivity instead of transparent electrode illustrated in FIGS. 1a and 1b. An optical compensation film 70 is inserted between the polarizer 40 and the outer surface of the upper substrate 10. The optical compensation film 70 is typically a ¼ wavelength phase lag film that has low dependence on the wavelength. The optic axis of this film usually forms an angle of 45° to the axis of the polarizer 40. The optical compensation film may be omitted if the design condition (for example, the twisted angle of the liquid crystal director) is changed.

Figure 4:
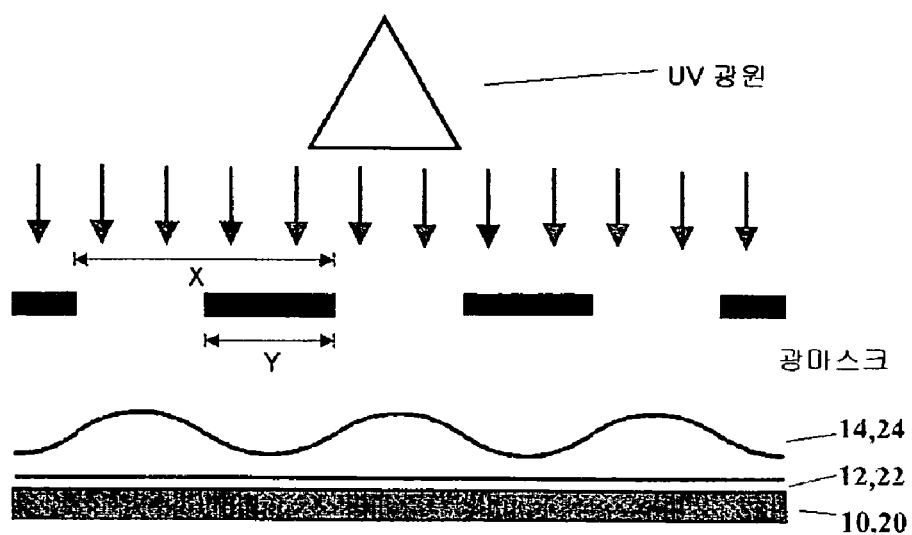
FIG. 4 illustrates the configuration of a photomask forming the one-dimensional surface undulation using a photoreactive resin.
Figure 5:
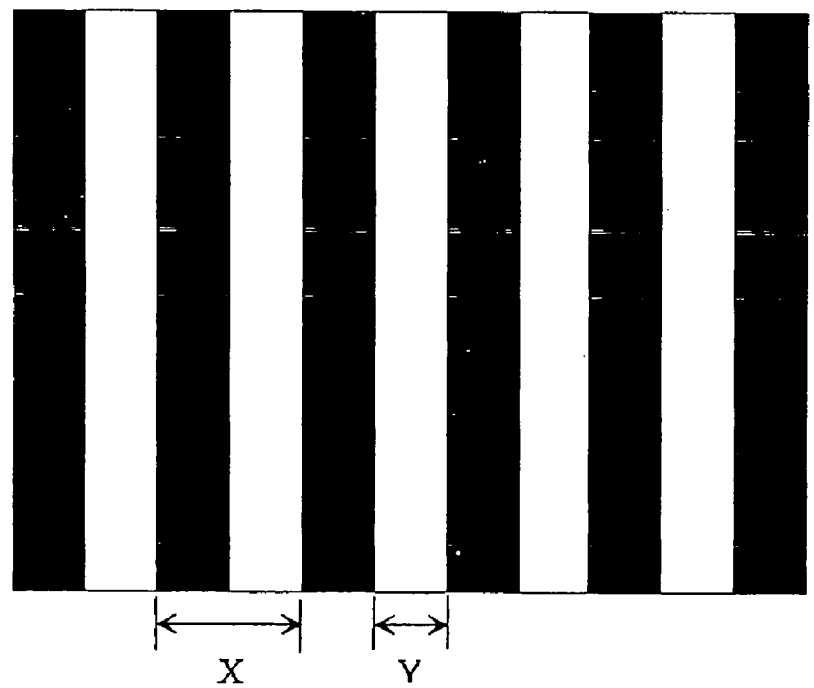
FIG. 5 illustrates the photomask illustrated in FIG. 4.

FIG. 4 illustrates how a liquid crystal display may be manufactured according to the present invention. It illustrates the configuration of a photomask forming one-dimensional surface undulation using a photo-reactive resin. As illustrated in FIG. 4, the upper electrode 12 or lower electrode 22 is formed on the upper substrate 10 or the lower substrate 20. The grating films of the photo-reactive polymer 14, 24 are formed on these substrates 10, 20. FIG. 5 illustrates a view of the photomask illustrated in FIG. 4.

In order to form one-dimensional surface undulation, many kinds of photo-reactive resins may be used. In this example, the ultraviolet photo-reactive resin (Norland Products Inc., NOA65) is uniformly coated in thickness of hundreds nanometers (nm) or less. The photo-reactive resin should have absorption wavelength band in the ultraviolet wavelength region and have high transmissivity in the visible light range. In addition, the refractive index of the resin is preferably as similar to ordinary refractive index of the liquid crystal 30 as possible for index matching. If there is a large difference between two refractive indices, the reflection and diffraction of light may occur at the interface of the grating film and the liquid crystal, and thus the contrast ratio becomes low. In this example, the refractive index of the photo-reactive resin is 1.52, and ordinary refractive index and the extraordinary refractive index of the nematic liquid crystal (Chisso, EN 37) is 1.488 and 1.582, respectively. The difference between the ordinary refractive index of the liquid crystal and the refractive index of the resin is approximately 2% in this example. Preferably, the resin is uniformly spread in thickness of hundreds of namometers (nm) or less to obtain a sufficient level of surface undulation because the resin has low viscosity. The ultraviolet light is irradiated on the photo-reactive resin through a photomask as illustrated in FIG. 4. The size and the period of the part wherein the ultraviolet light is transmitted through the photomask may be adjusted to obtain the desired size of pixels. In this example, the size is as follows: X=400 μm and Y=200 μm.

The height of the surface undulation may be determined according to the amount of the irradiated ultraviolet light. Generally, the height of the surface undulation increases as the amount of the ultraviolet light energy increases. However, above a certain critical amount of irradiation, the height of the surface undulation is saturated and thus it is not further increased. In this example, the source of ultraviolet is a lamp of Xe—Hg, and it irradiates the ultraviolet light in the absorption wavelength region which is proper for resin hardening.

After the irradiation of the ultraviolet light through the photomask, the ultraviolet is irradiated on the whole area of the substrate once more without the photomask for photo hardening of the resin. Then, on the formed grating film 14, 24, a vertical alignment agent (JALS 2021-R1, Synthetic Rubber, Japan) is spin-coated and the heat-treatment is conducted. The vertical alignment films 16, 26 are then formed.

The upper substrate 10 and the lower substrate 20 formed as above are configured so that the directions of the two surface undulation are perpendicular to each other. The angle formed by the directions of the surface undulation on the upper substrate 10 and the lower substrate 20 may be arbitrary. However, in this example, this angle is 90°. The upper substrate 10 and the lower substrate 20 are assembled with maintaining the gap using glass spacers, and then the liquid crystal 30 is injected between them and then sealed. In this example, the injected liquid crystal 30 is EN-37 (Chico) and its dielectric anisotropy is −3.0.

Figure 6A:
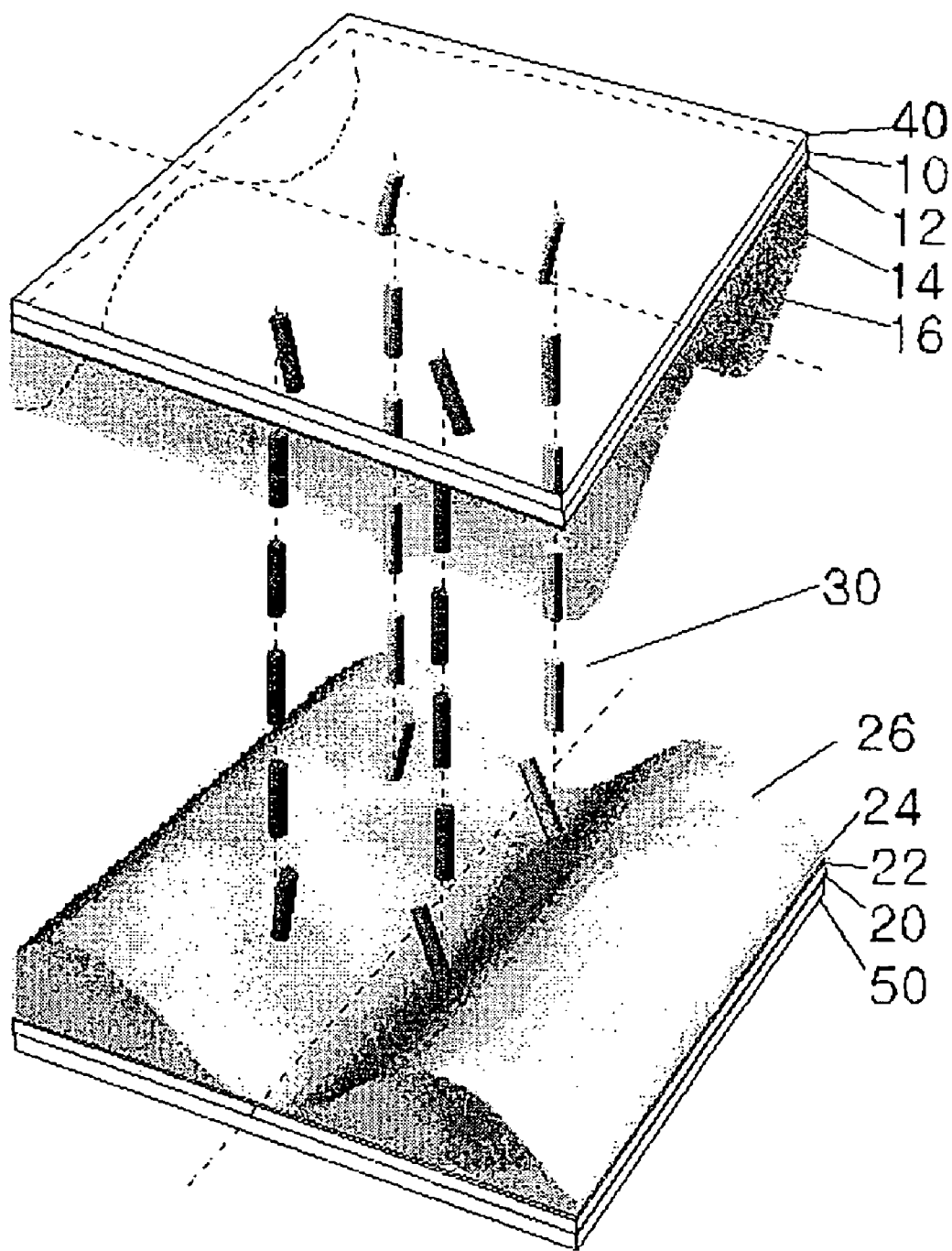
FIGS. 6a and 6b illustrate the alignment structure of the liquid crystal directors in the liquid crystal display of the present invention.
Figure 6B:
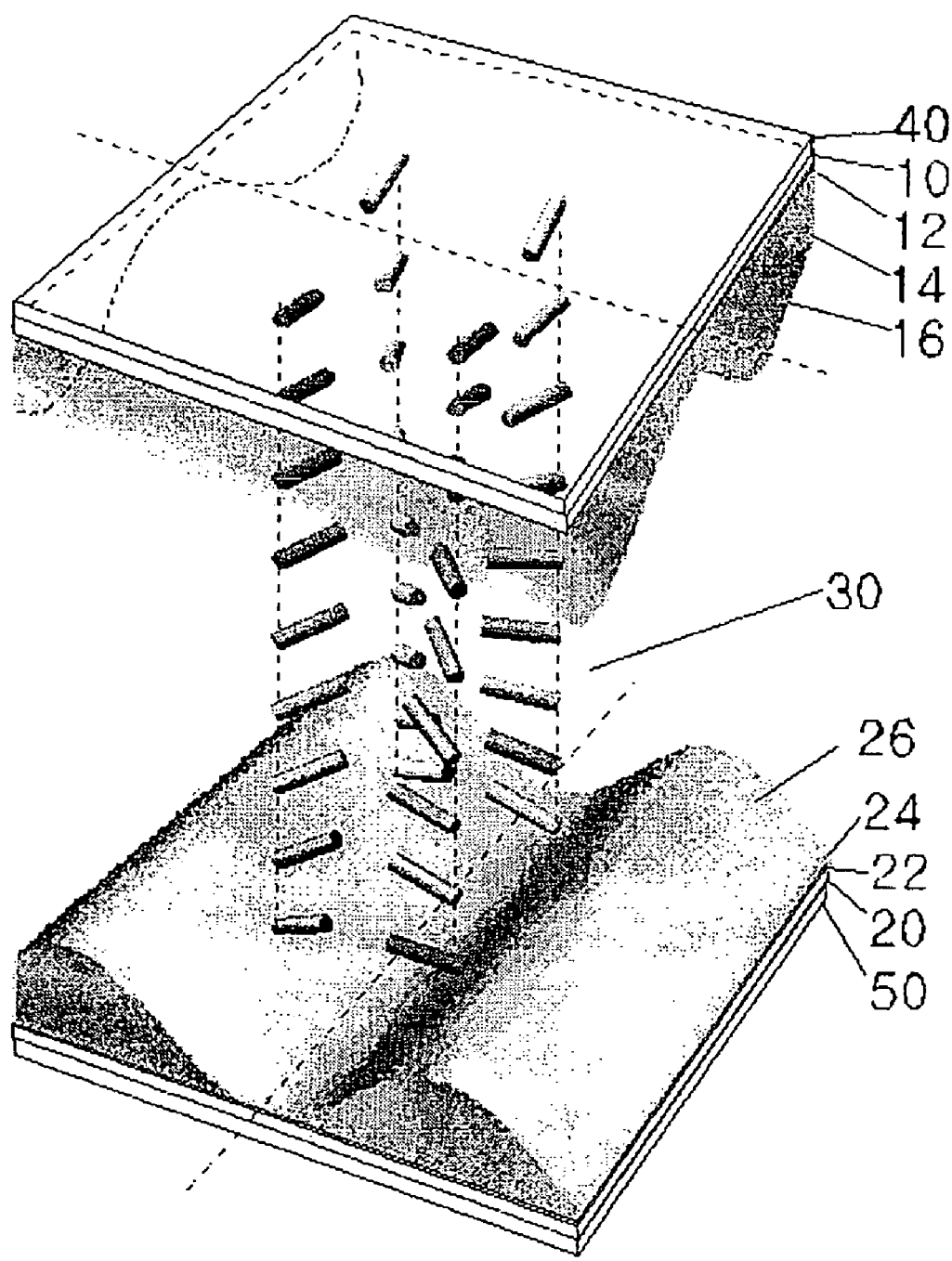

FIG. 6a illustrates an alignment structure of the liquid crystal director in the liquid crystal display of the present invention when no electric field is applied. FIG. 6b illustrates the alignment structure of the liquid crystal director when an electric field is applied.

As illustrated in FIGS. 6a and 6b, the polarizers 40, 50 which are perpendicular to each other are attached on the outer surfaces of the upper substrate 10 and the lower substrate 20, respectively. The liquid crystal display in the transmissive mode may be implemented if a backlight unit is used. Additional optical compensation films may be inserted between the outer surfaces of the upper substrate 10 and the lower substrate 20 and the respective polarizers. The optic axis of the optical compensation film is preferably configured to form an angle of approximately 45° to the optic axis of one of two polarizer. In addition, as illustrated in FIGS. 3a and 3b, the liquid crystal display in the reflection mode may be implemented by forming the reflection plate on the inner surface or the outer surface of one substrate of the upper substrate 10 and the lower substrate 20, and then attaching the polarizer on the outer surface of the other substrate.

As illustrated FIG. 6a, the liquid crystal molecules are aligned perpendicularly to the surface on an average when no electric field is applied. The liquid crystal close to the surface undulation on the lower surface 20 may be locally aligned perpendicularly to the surface grating film. However, the difference of the pretilt angle according to the position is so small, for example 2° or less from the direction normal to the substrate. This is practically identical to the perpendicular alignment from the optical viewpoint.

As illustrated in FIG. 6b, the directional symmetry is broken and the liquid crystal is tilted away from the direction normal to the substrate because of the presence of the surface undulation when the electric field is applied. There are four kinds of directions of the molecular tilt because there are two tilt directions in one period of the surface undulation on the lower surface 20, and there are also two tilt directions in one period of surface undulation on the upper substrate 10, and the tilt directions of the upper substrate 10 are perpendicular to those of the lower substrate 20. Therefore, a liquid crystal display having four kinds of multi-domains where each region is twisted differently with each other may be obtained. The wide viewing angles may be obtained because of such broken directional symmetry.

Figure 7:
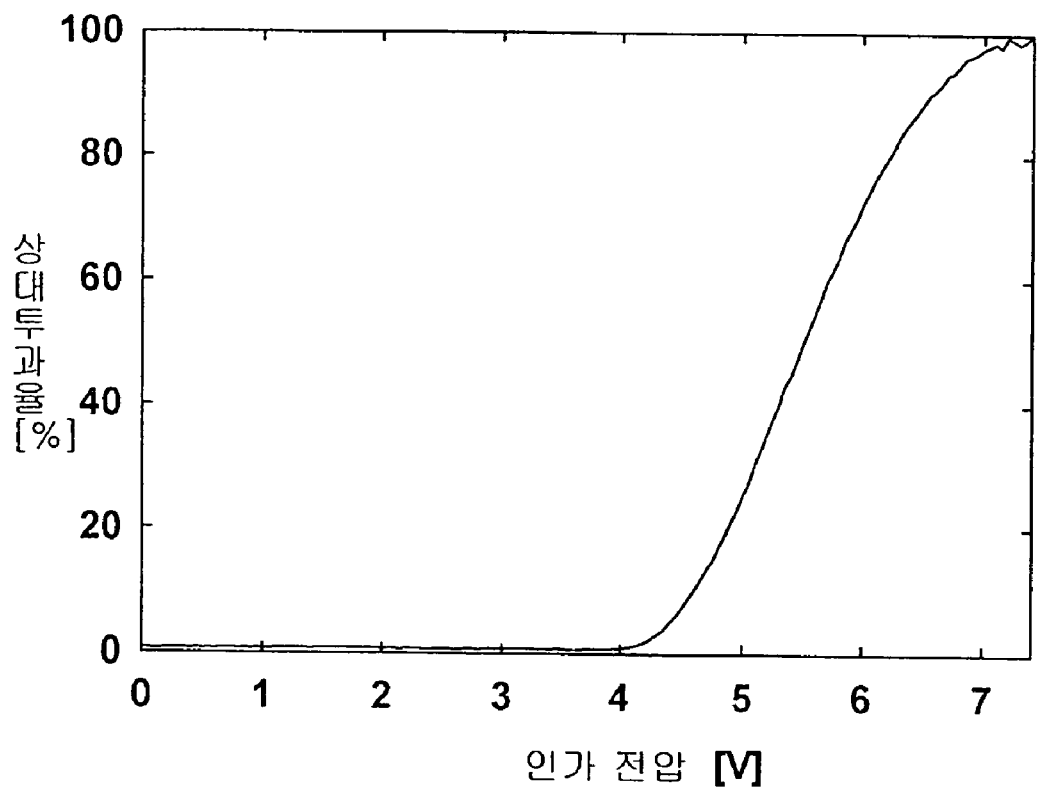
FIG. 7 illustrates the intensity of the transmitted light depending on the applied voltage in a liquid crystal display of the present invention.
Figure 8A:
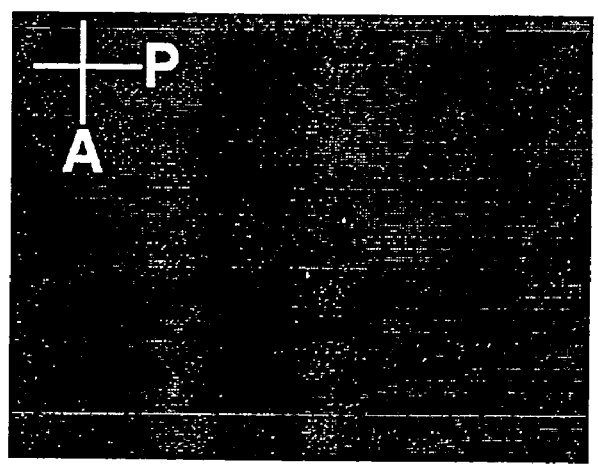
FIGS. 8a, 8b and 8c are microscopic photographs of a liquid crystal display according to the present invention.
Figure 8B:
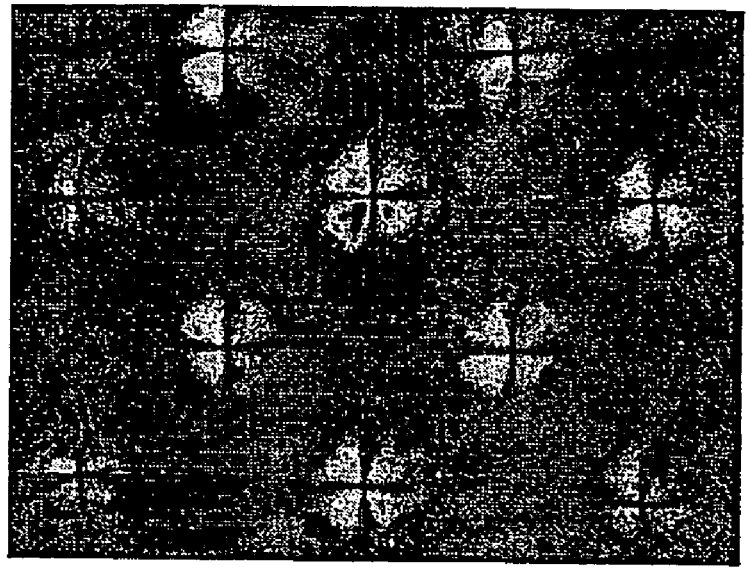
Figure 8C:
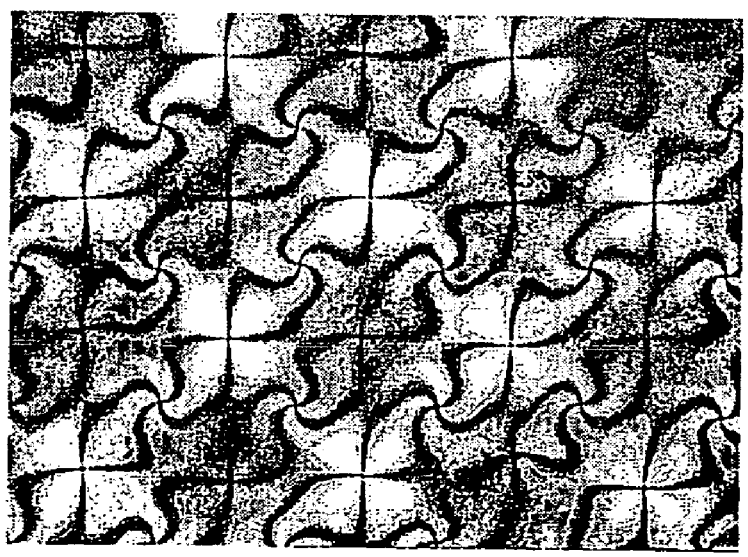

FIG. 7 illustrates the intensity of the transmitted light depending on the applied voltage in the liquid crystal display of the present invention. FIG. 8a is a microscopic photograph of the liquid crystal display under crossed polarizers according to the present invention when no electric field is applied. FIG. 8b is a microscopic photograph of the liquid crystal display under crossed polarizers according to the present invention when the voltage of 4.1[V] is applied. FIG. 8c is a microscopic photograph of the liquid crystal display when the voltage of 5.0[V] is applied.

In the photograph of FIG. 8a, "P" represents the optic axis of the upper polarizer 40, and "A" represents the optic axis of the lower polarizer 50. As illustrated in FIGS. 8a, 8b and 8c, it is completely dark if no electric field is applied. If the electric field is applied, it is on state which has four multi-domains. The multi-domain structure becomes different due to the difference in the thickness of the polymer resin as the applied voltage increases. Because of such multi-domains, the sub-pixels having different alignment structures in a unit pixel are formed, and viewing angles of the sub-pixels are compensated. Therefore, the high contrast and wide viewing angles are obtained. If one-dimensional surface undulation is used, the period of the surface undulation is preferably between ¼ and 2 times of the period of pixels.

Figure 9A:
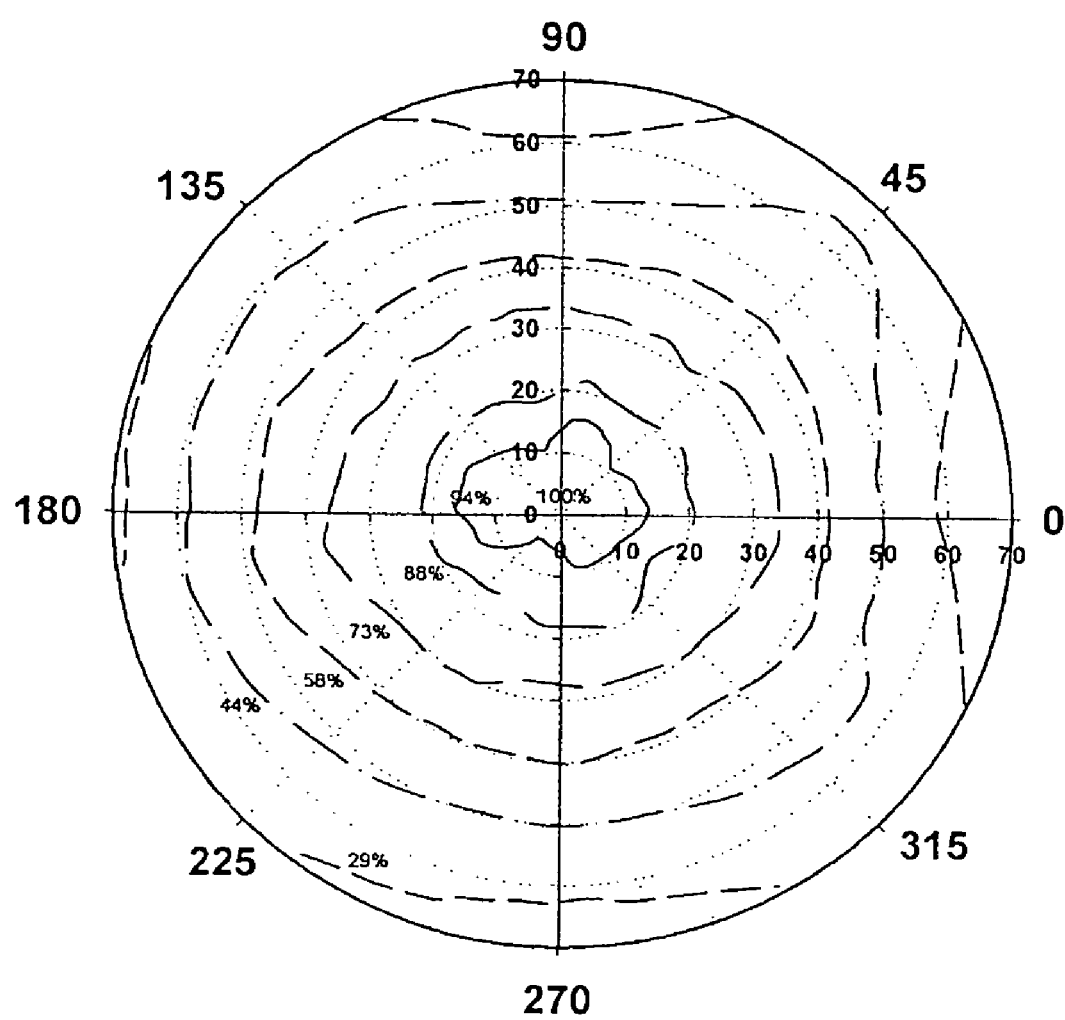
FIGS. 9a and 9b illustrate the characteristics of the viewing angle in the azimuthal angle plane when the voltage is applied to a liquid crystal display of the present invention.
Figure 9B:
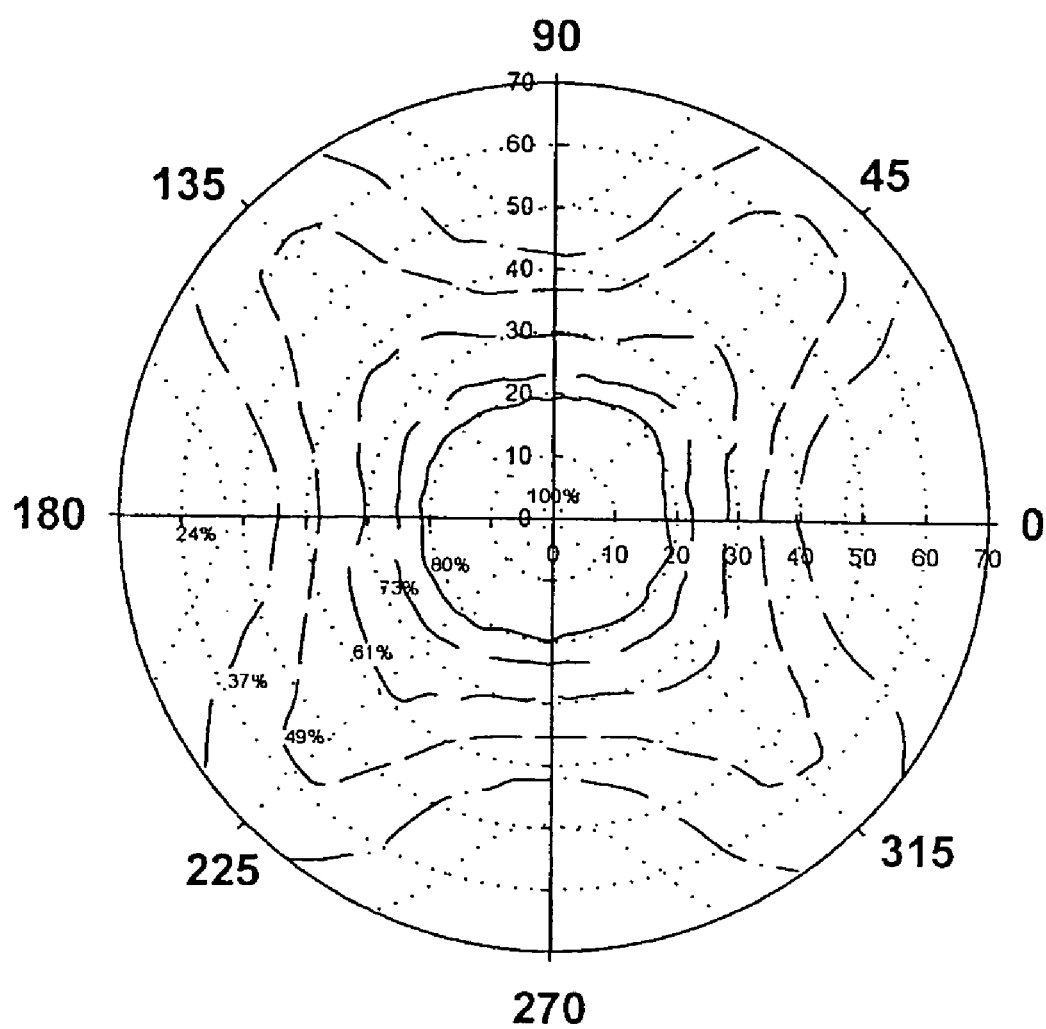

FIG. 9a illustrates the characteristics of the viewing angle in the azimuthal plane when the voltage of 6.23[V] is applied to the liquid crystal display of the present invention. FIG. 9b illustrates the characteristics of the viewing angle in the azimuthal plane when the voltage of 7.45[V] is applied. As illustrated in FIGS. 9a and 9b, wide and symmetric viewing angle characteristics are obtained at all azimuthal angles because the four multi-domains compensate optically in the azimuthal plane. In the meanwhile, it is observed that the viewing characteristics shown in FIG. 9a have lower directional dependence than that in FIG. 9b. It means that the optical compensation at the applied voltage in FIG. 9a is more effective than that in FIG. 9b. Furthermore, the voltage dependence of the optical compensation may be modified according to the magnitude of the refraction index of the liquid crystal and the thickness of the liquid crystal cell. The transmissivity characteristic has high dependence of direction because the liquid crystal molecules have initial vertical alignment state. The reason is that the effective double refraction occurs in a direction different from the optic axis of polarizer and some of light is transmitted through this device. As a result, the characteristic of contrast ratio for azimuthal angle is deteriorated. According to the present invention, the characteristics of the viewing angle is improved by using an optical compensation film (preferably, uniaxial phase difference film) that has an optic axis perpendicular to the surface and has negative optical anisotropy in order to compensate for any directional dependence of the viewing angles.

The vertical alignment film may be unnecessary in this example if the photo-reactive resin forming the surface grating film has a function of aligning the liquid crystal vertically.

INDUSTRIAL APPLICABILITY

As explained above, the liquid crystal display wherein the multi-domains are formed in each pixel using surface undulation, and the sub-pixels having different alignment structures with each other in a pixel is provided. Because of the optical compensation of the viewing angles of the sub-pixels to one another, high contrast ratio and wide viewing angles are obtained. The manufacturing process of the liquid crystal display of the present invention is simpler than the conventional rubbing process for forming multi-domains. Furthermore, this process may be applied for mass production because the multi-domain method of the present invention may not create defects and may be more precisely controlled in comparison to the prior art of the conventional multi-domain method for wide viewing angles.

What is claimed is:

1. A liquid crystal display comprising:
   an upper substrate having an inner surface on which an upper electrode and an upper grating film having surface undulation are laminated;
   a lower substrate having an inner surface on which a lower electrode and a lower grating film having surface undulation are laminated, the inner surface of the lower substrate facing the inner surface of the upper substrate; and
   a liquid crystal having dielectric anisotropy which is sealed in the space between the upper substrate and the lower substrate,
   wherein each of pixels having a predetermined period includes a plurality of sub pixels having different alignment structures in one period,
   wherein the surface undulations are one-dimensional and the period of the surface undulations is between ¼ and 2 times of the predetermined period of the pixels.

2. The liquid crystal display according to claim 1, wherein the upper grating film having surface undulation is laminated upon the upper electrode in the upper substrate.

3. The liquid crystal display according to claim 1, wherein the lower electrode is laminated upon the upper grating film having surface undulation in the upper substrate.

4. The liquid crystal display according to claim 1, wherein the lower grating film having surface undulation is laminated upon the lower electrode in the lower substrate.

5. The liquid crystal display according to claim 1, wherein the lower electrode is laminated upon the lower grating film having surface undulation in the lower substrate.

6. The liquid crystal display according to claim 1, wherein the angle formed between the direction of the surface undulation on the upper substrate and the direction of the surface undulation on the lower substrate is between 0° and 180°.

7. The liquid crystal display according to claim 6, wherein the angle formed between the direction of the surface undulation on the upper substrate and the direction of the surface undulation on the lower substrate is approximately 90°.

8. The liquid crystal display according to claim 1, wherein at least one of the upper grating film of the upper substrate and the lower grating film of the lower grating film of the lower substrate is a vertical alignment film.

9. The liquid crystal display according to claim 8, wherein the pretilt angle of the liquid crystal from the direction normal to the upper substrate or the lower substrate having the vertical alignment film is between 0° and 9°.

10. The liquid crystal display according to claim 1, wherein at least one of the upper grating film on the upper substrate and the lower grating film on the lower substrate is a horizontal alignment film.

11. The liquid crystal display according to claim 10, wherein the pretilt angle of the liquid crystal from the direction normal to the upper substrate or the lower substrate having the horizontal alignment film is between 0° and 9°.

12. The liquid crystal display according to claim 1, wherein the surface undulation is formed using a heat-reactive film.

13. The liquid crystal display according to claim 1, wherein the surface undulation is formed using a photo-reactive resin.

14. The liquid crystal display according to claim 13, wherein the photo-reactive resin material is an ultraviolet-reactive resin and the difference between the ordinary refractive index of the liquid crystal and the refractive index of the photo-reactive resin is 2% or less.

15. The liquid crystal display according to claim 14, wherein the height of the surface undulation is determined according to the amount of the irradiated ultraviolet light.

16. The liquid crystal display according to claim 1, further comprising polarizers which are formed on the outer surfaces of the upper substrate and the lower substrate, the optic axes of the said polarizers being perpendicular to each other; and a backlight unit.

17. The liquid crystal display according to claim 16, further comprising optical compensation films between the outer surfaces of the upper substrate and the lower substrate and the respective polarizers.

18. The liquid crystal display according to claim 17, wherein the optic axes of the optical compensation films are configured to form approximately 45° to the optic axes of the relevant polarizers.

19. The liquid crystal display according to claim 1, further comprising a reflection plate formed on the inner surface or the outer surface of at least one of the upper substrate and the lower substrate; and a polarizer formed on the outer surface of the substrate other than the substrate whereupon the reflection plate is formed.

20. The liquid crystal display according to claim 19, further comprising an optical compensation film between the polarizer and the substrate whereupon the polarizer is formed.

21. The liquid crystal display according to claim 20, wherein the optic axis of the optical compensation film is configured to form approximately 45° to the optic axis of the polarizer.

22. The liquid crystal display according to claim 1, wherein the liquid crystal is rearranged in a multi-domain structure when an electric field is applied.

23. A liquid crystal display comprising:
an upper substrate on which an upper electrode and an upper grating film having a first undulation are formed, the first undulation being substantially parallel with a first direction;
a lower substrate on which a lower electrode and a lower grating film having a second undulation are formed, the lower substrate facing the upper substrate, the second undulation being substantially paraliel with a second direction that is different from the first direction; and
a liquid crystal between the upper substrate and the lower substrate, the liquid crystal being periodically arranged and having at least two pretilt angles in one period.

24. The liquid crystal display according to claim 23, wherein the liquid crystal is rearranged in a multi-domain structure when an electric field is applied.

25. The liquid crystal display according to claim 23, wherein the first and second directions are substantially perpendicular to each other.

26. The liquid crystal display according to claim 23, wherein the first undulation has a first convex portion and a first concave portion, and the second undulation has a second convex portion and a second concave portion.

27. The liquid crystal display according to claim 26, wherein the first convex portion is substantially symmetrical to a surface that passes through a top line thereof and is substantially perpendicular to the upper substrate, and the first concave portion is substantially symmetrical to a surface that passes through a bottom line thereof and is substantially perpendicular to the upper substrate.

28. The liquid crystal display according to claim 26, wherein the second convex portion is substantially symmetrical to a surface that passes through a tap line thereof and is substantially perpendicular to the lower substrate, and the second concave portion is substantially symmetrical to a surface that passes through a bottom line thereof and is substantially perpendicular to the lower substrate.

29. A liquid crystal display comprising:
an upper substrate on which an upper electrode and an upper grating film having a first undulation are formed, the first undulation being substantially parallel with a first direction;
a lower substrate on which a lower electrode and a lower grating film having a second undulation are formed, the lower substrata facing the upper substrate, the second undulation being substantially parallel with a second direction that is different from the first direction; and
a liquid crystal disposed between the upper substrate and the lower substrate,
wherein the first and second undulations form at least four multi-domains in one period of a unit pixel.

* * * * *